(No Model.)

A. E. LINCOLN.
MACHINE FOR CUTTING SOLES.

No. 560,224.  Patented May 19, 1896.

WITNESSES.
John R. Snow.

INVENTOR
Amasa E. Lincoln,
by his attorney, (No Model.) 7 Sheets—Sheet 4.
A. E. LINCOLN.
MACHINE FOR CUTTING SOLES.

No. 560,224. Patented May 19, 1896.

WITNESSES
John R. Snow.
H. P. Guillo

INVENTOR
Amasa E. Lincoln.
by his attorney, (No Model.) 7 Sheets—Sheet 7.
A. E. LINCOLN.
MACHINE FOR CUTTING SOLES.

No. 560,224. Patented May 19, 1896.

WITNESSES.
John R. Snow.

INVENTOR.
Amasa E. Lincoln
by his attorney,

UNITED STATES PATENT OFFICE.

AMASA EUGENE LINCOLN, OF STOUGHTON, MASSACHUSETTS.

MACHINE FOR CUTTING SOLES.

SPECIFICATION forming part of Letters Patent No. 560,224, dated May 19, 1896.

Application filed February 15, 1895. Serial No. 538,527. (No model.)

*To all whom it may concern:*

Be it known that I, AMASA EUGENE LINCOLN, of Stoughton, in the county of Norfolk and State of Massachusetts, have invented an Improved Machine for Cutting Soles and other Irregular Forms, of which the following is a specification, reference being had to the accompanying drawings, in which—

Figure 1:
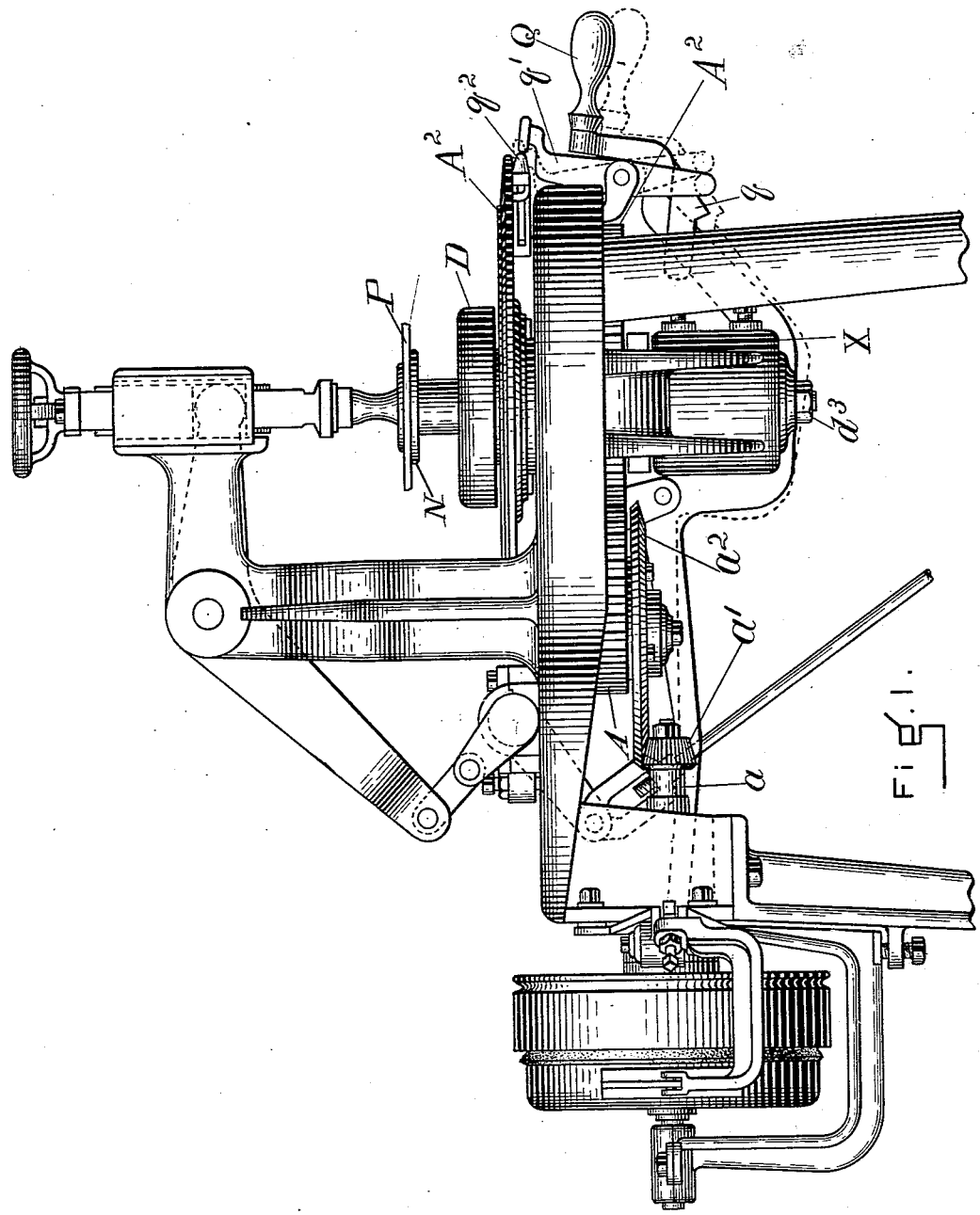
Figure 2:
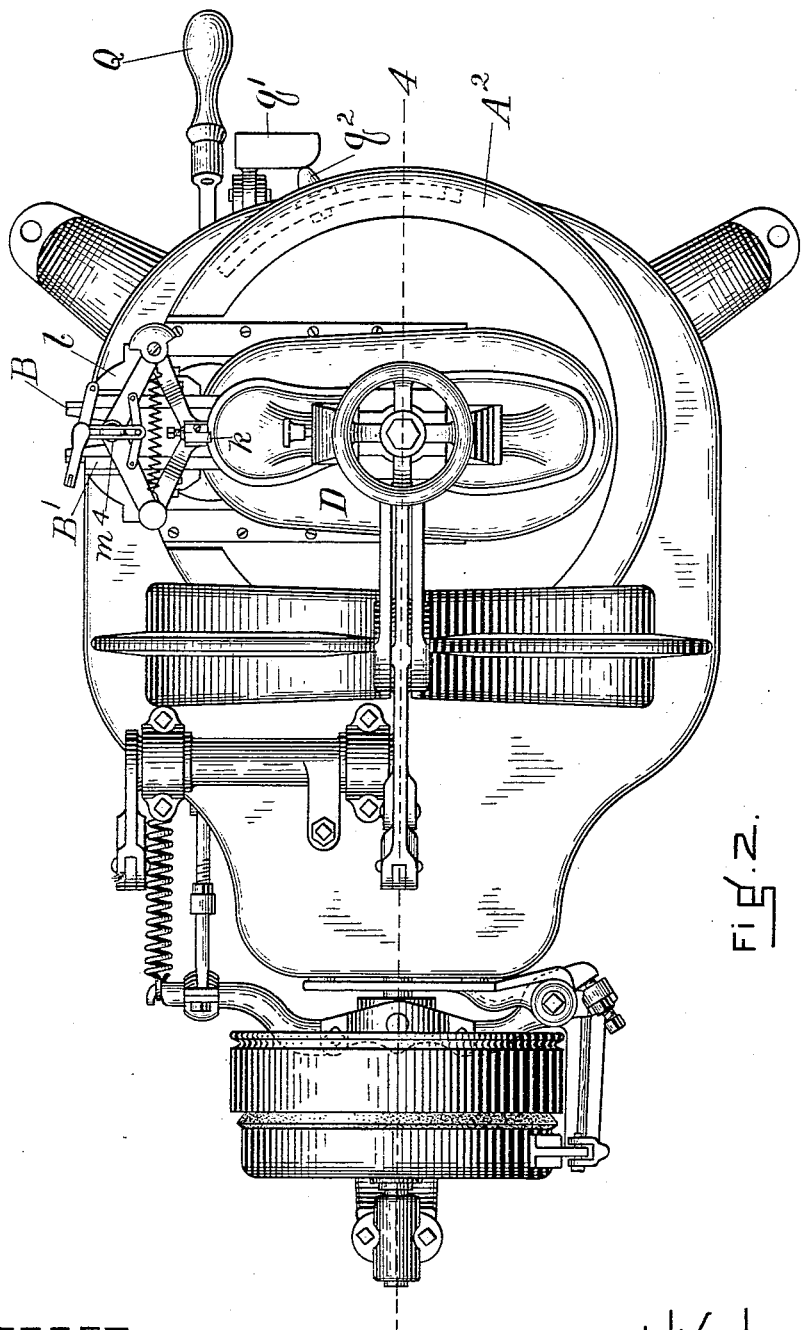
Figure 3:
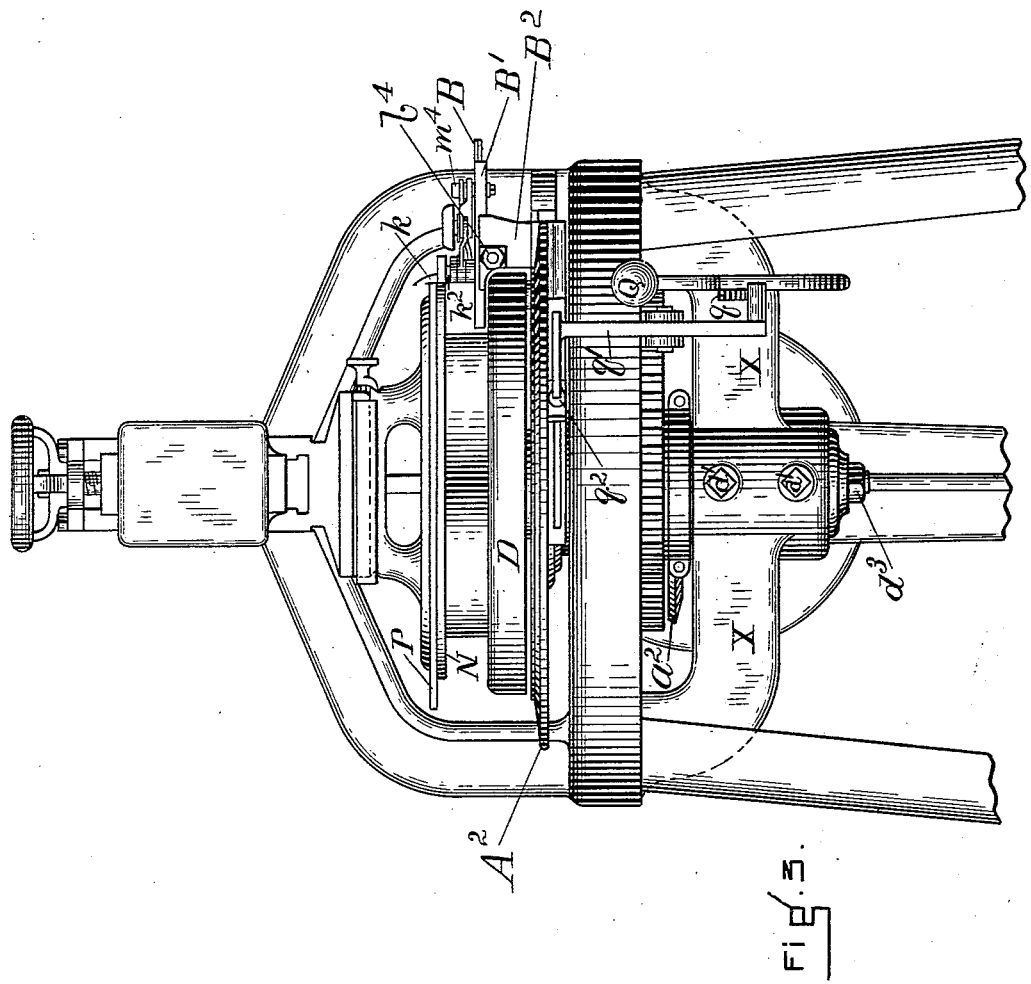
Figure 4:
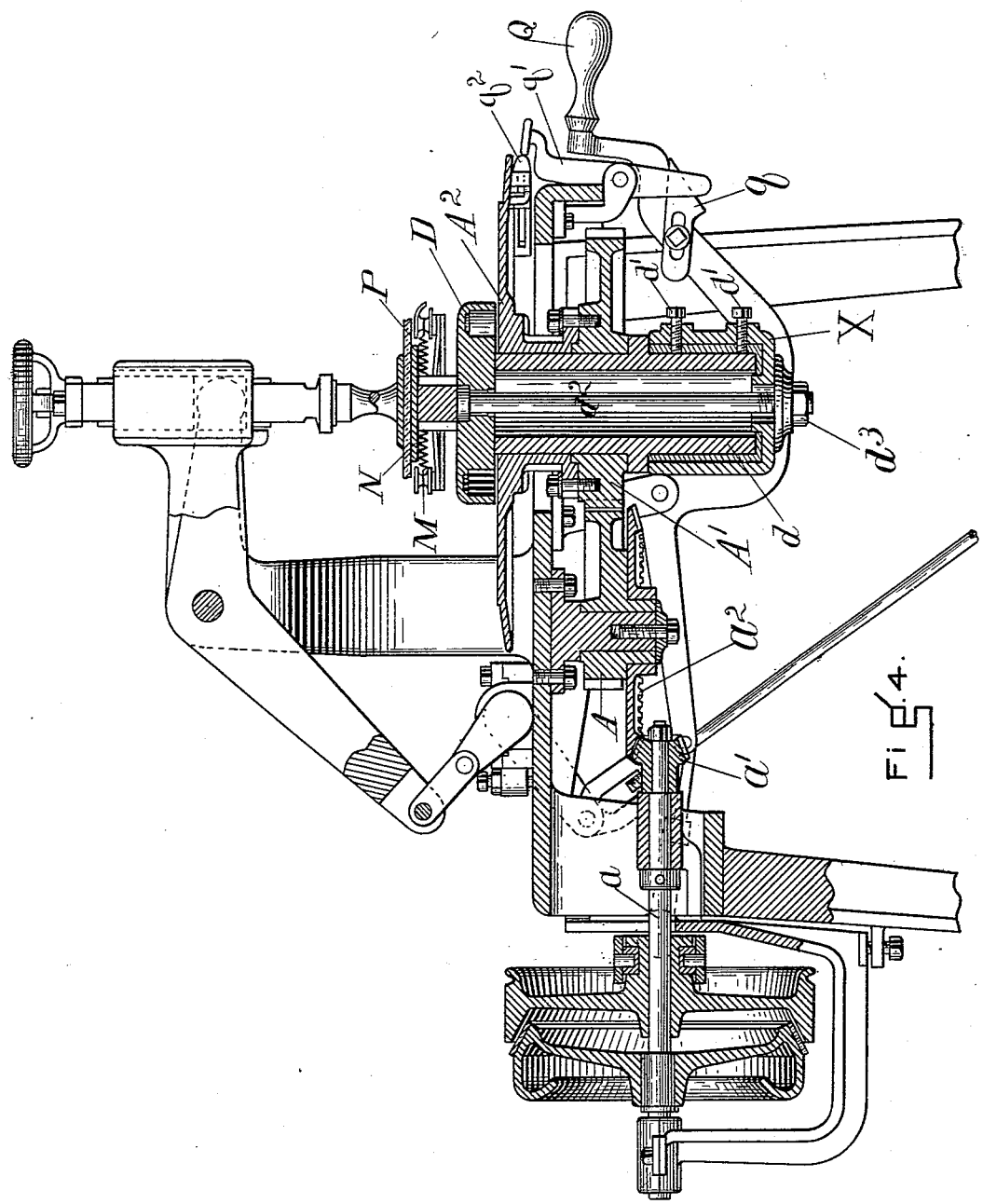
Figure 5:
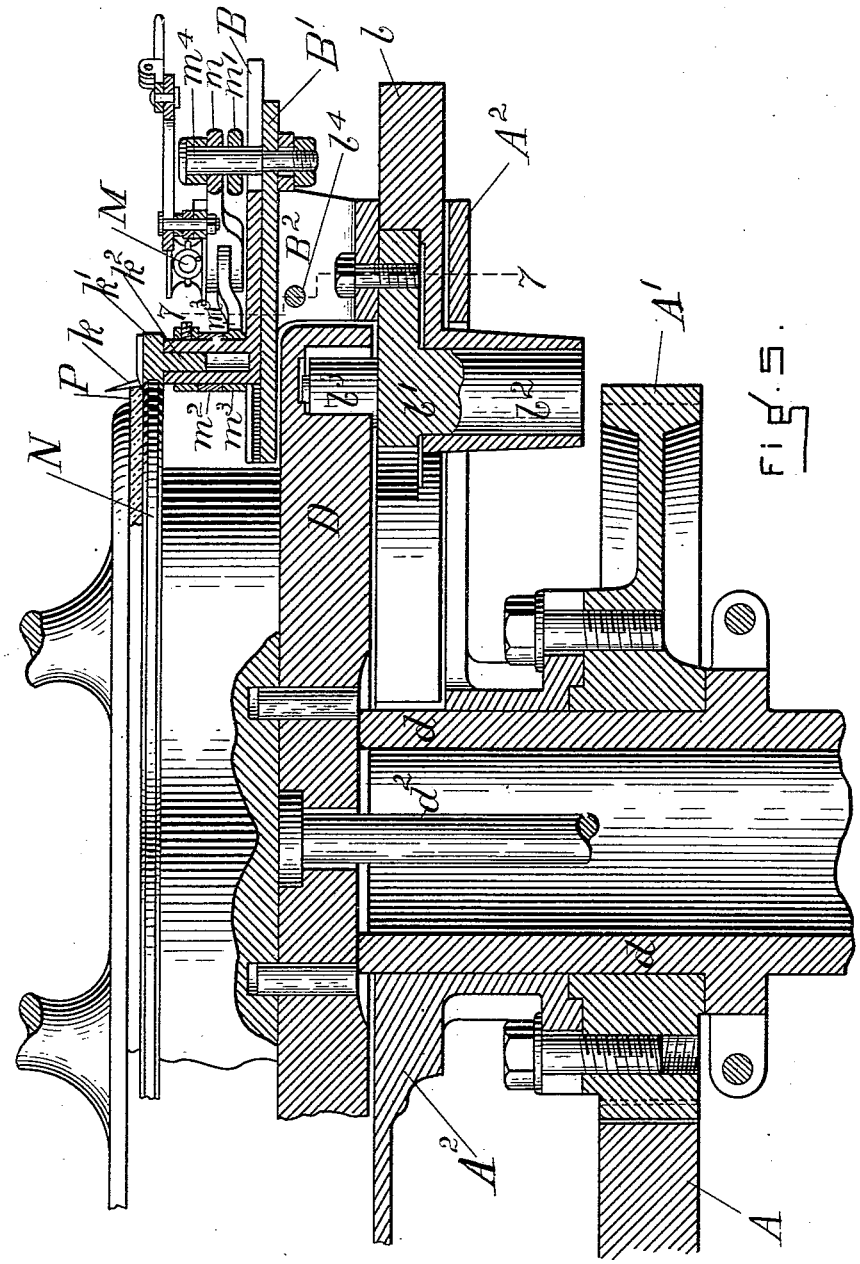
Figure 6:
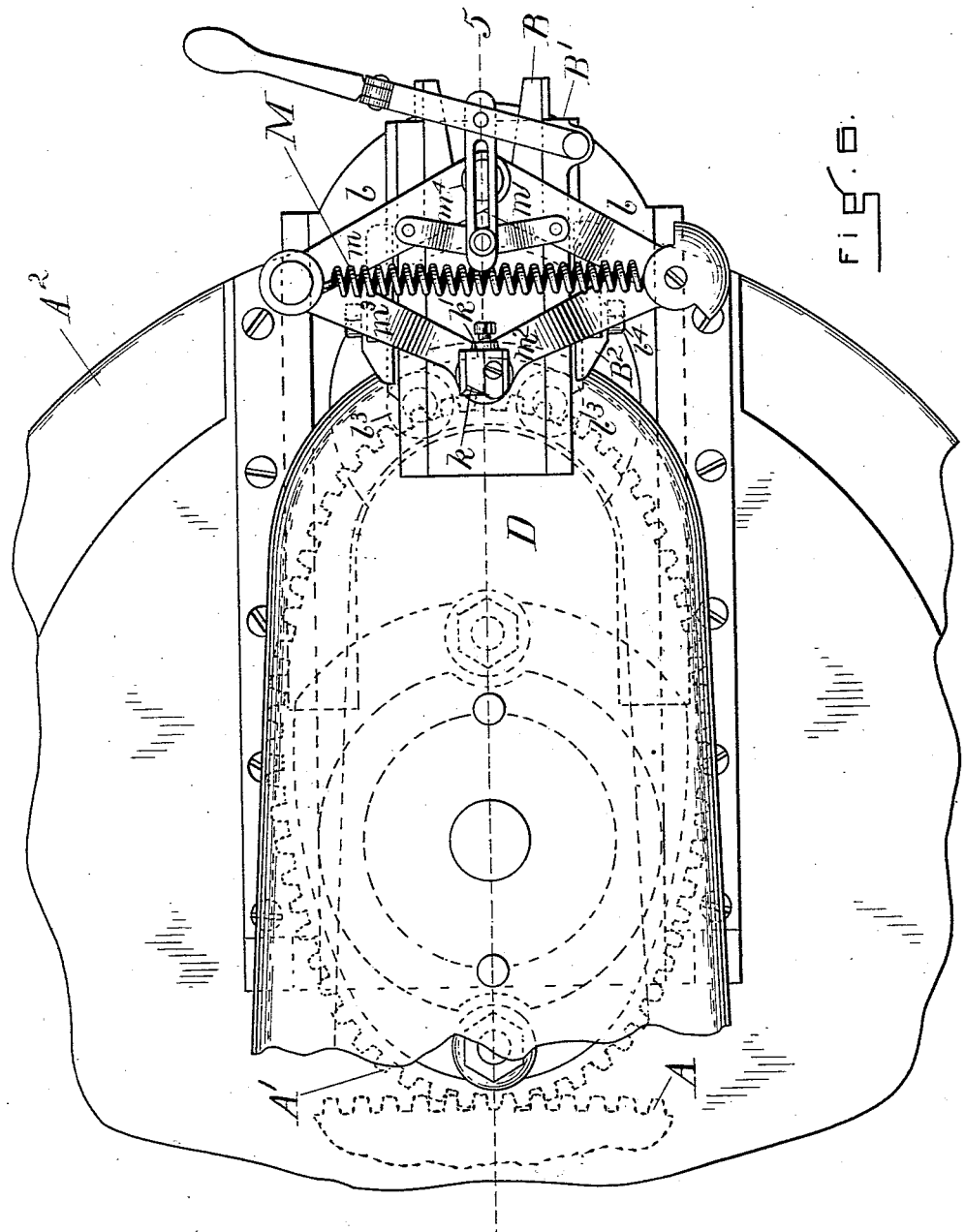
Figure 7:
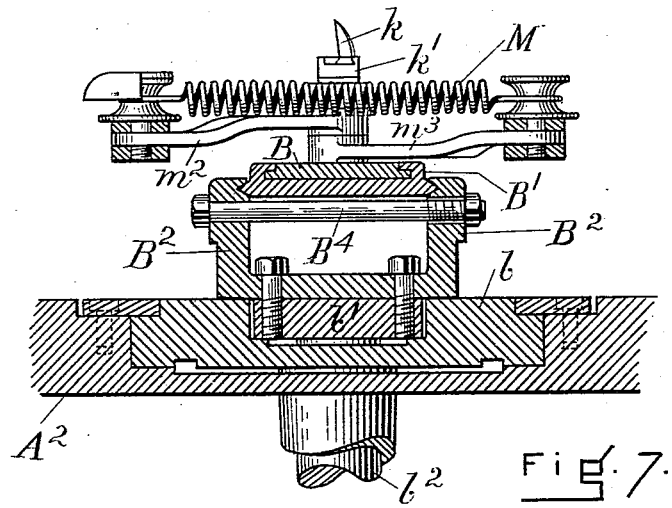
Figures 8, 9, 10:
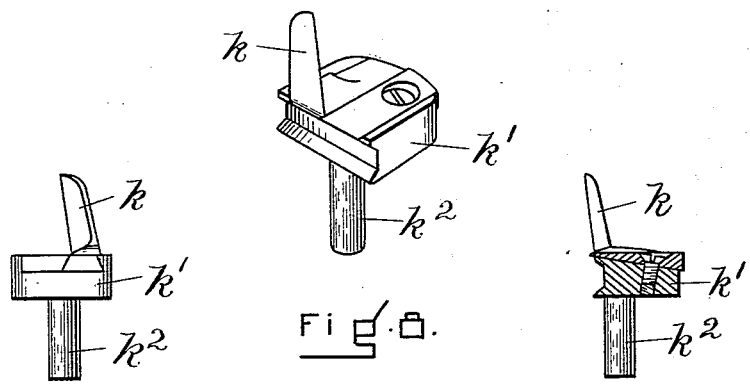

Figure 1 is a side elevation of one of my improved machines. Fig. 2 is a plan. Fig. 3 is an end elevation. Fig. 4 is a section on line 4 4 of Fig. 2. Figs. 5 and 6 are details, on a larger scale, illustrating certain features not fully shown in the other figures. Fig. 7 is a section, on line 7 7 of Fig. 5, to illustrate the construction of the knife-carriage. Figs. 8, 9, and 10 illustrate the knife and tracer.

Machines for cutting soles and the like from sheet material have long been known, and such machines have consisted mainly of a clamp for holding the leather or other sheet material, a pattern to determine the path of the knife, a knife-carriage and a cam-groove to control the motions of the main part of the knife-carriage, and mechanism to travel the knife-carriage about the pattern.

My invention consists, first, in the combination, with the pattern, of a knife-carriage, a plate or table upon which the carriage is suitably mounted, a shaft carrying that plate or table, an oblong eccentric gear fast to that shaft, a second oblong eccentric gear meshing with the first, and means for driving that second gear, these parts properly arranged constituting the main portion of a new kind of machine for cutting soles or the like, far simpler, much more compact and durable, and practically better in all respects than any other before known; secondly, in an improved knife-carriage, and, thirdly, in an improved construction of the knife-holder and the pattern by which it is guided, all of which I will now describe more fully with reference to the drawings.

In the drawings I have shown my machine as driven by the shaft $a$ and bevel-gears $a'$ $a^2$, as this is the most convenient way of rotating the oblong gear A, which is fast to gear $a^2$. (See Fig. 4.) Gear A meshes with oblong gear A', and gear A' is fast to the plate $A^2$, on which plate the knife-carriage is mounted so that it can move toward and from the axis of plate $A^2$ and gear A'. This is the first feature of my invention, and the new result is that the speed of plate $A^2$ and of the knife-carriage B can be regulated to suit the form to be cut, as the speed of the knife-carriage can be made faster or slower at any portion of its path, as desired. For example, on pointed or square toes it is desirable to have a slow speed, and the speed at the point may be made very slow by my invention without diminishing the product of the machine, for by shaping the gears A and A' properly the speed of the knife-carriage may be just what is required at any point of its path. Several devices have heretofore been contrived for varying the speed of the knife-carriage at one or more places in its path; but all such devices have been much less simple and durable and much more expensive than mine.

The means shown for connecting table or plate $A^2$ with the knife-carriage are the slide $b$, mounted in ways in plate $A^2$, and a swivel-head $b'$, held to the slide $b$ by the pin $b^2$, fast to swivel-head $b'$, the support $B^2$ of the knife-carriage being fast to swivel-head $b'$. Two rolls, one of which, $b^3$, is shown in Fig. 5, are fast to the swivel-head $b'$ near the axis of pin $b^2$, and these rolls are controlled by the cam-groove in cam D, which is fast to the frame of the machine, preferably as shown in Figs. 4 and 5 of the drawings, where it is mounted upon sleeve $d$, held by the set-screws $d'$ to cross-piece X of the frame of the machine, the sleeve $d$ serving also as the journal for the gear A' and plate $A^2$. I prefer to hold cam D in place by means of bolt $d^2$ and its nut $d^3$, as clearly shown in Figs. 4 and 5. The slide $b$ is forked at its inner end, as shown in dotted lines in Fig. 6, to enable it to clear sleeve $d$. These details of construction may, as will be clear, be varied widely, for it is immaterial what means be used to connect the knife-carriage with plate $A^2$ so long as suitable means be used; but the means shown are preferable on the whole to others that I have contemplated, and these means are in certain respects new with me, and in these respects constitute a feature of my invention.

While the combination of part B' of the carriage with the cam D for giving part B' its motions on plate or table $A^2$ is not new with me, yet the combination of the knife-carriage with the cam D and a slide $b$ by means of the head $b'$, fast to part B' of the carriage, that head $b'$ being connected to the slide $b$ by pin $b^2$, journaled in slide $b$, and to cam D by means of guide-rolls $b^3$, whose studs are fast to the head $b'$ and on either side of the axis of pin $b^2$, is new with me and constitutes a subcombination which is practically of much importance, as it causes cam D to act upon slide $b$ much the same as if pin $b^2$ were fast to slide $b$, and yet allows part B' of the carriage to swivel on the axis of pin $b^2$ as slide $b$ and part B' are moved by cam D toward and away from the axis on which plate $A^2$ revolves.

My improvements in the knife-carriage relate, first, to its greater adjustability, and, secondly, to the arrangement of the spring by which the carrier of the knife-holder is allowed to yield, as required by the pattern N.

My improved knife-carriage consists of the support $B^2$, in which is clamped the bed B', which is adjustable with relation to support $B^2$. The best construction to embody this part of my invention is to make the bed B' in the form of a slide and to provide the support $B^2$ with ways for slide B', and with a clamping device, as bolt $b^4$ and its nut, by which bed B' can be solidly clamped to support $B^2$ after bed B' is properly adjusted. By this improvement the knife-carriage can be so adjusted with relation to the size of the sole as to reduce the motion of the carrier of the knife-holder to the minimum, and this is an important result wholly new with me. This adjustable bed B' carries slide B, and the hollow stud on slide B receives the pin $k^2$, with which tracer $k'$ and knife $k$ swivel. The knife-carriage proper is made up, therefore, of the support $B^2$ and adjustable bed B', which in use are practically one piece moving with the swivel-head $b'$, as that swivel-head is controlled by the cam D, and of the slide B, whose motions with relation to bed B' are controlled by spring M and by the tracer $k'$, which follows the pattern N, thereby causing the knife $k$ to move in the exact path desired.

While knife-carriages are well known, consisting of a main portion whose motions are controlled by cam D, and a knife-carrying portion whose motions with relation to the main portion are controlled by a spring and a tracer acting on a pattern, yet my improved knife-carriage embodies not only the invention just described, but in addition a new combination of the knife-carrying portion or slide B with the main portion of the knife-carriage (whether in two parts B' B² or in one piece, as heretofore) by means of spring M and links $m\ m'\ m^2\ m^3$, the new result being that the force of spring M is kept nearly constant whether the knife $k$ be cutting at the toe or heel, or whether it be cutting at the shank, for when spring M is strongest the toggle-links $m\ m'\ m^2\ m^3$ are holding it with more force than when spring M is weakest, and as it is the spring M which keeps the tracer $k'$ against the pattern N it is practically of great advantage to use a spring whose force is about the same at all times, as thereby injury to the edge of the pattern is prevented. The inner ends of links $m$ and $m'$ are journaled on stud $m^4$, fast to the adjustable slide B', and the inner ends of links $m^2\ m^3$ are journaled on the hollow stud on slide B.

Another feature of my invention also relates to decreasing the wear of the edge of the pattern N, and also to supporting the stock near the knife-edge, and I accomplish this by beveling the corners of the edge of the pattern and grooving the acting face of the tracer $k'$ to correspond and so arranging the pattern N that it forms one member of the clamp by which the stock P is held, so that one edge of the groove in the tracer $k'$ moves between the stock and the pattern N, thus supporting the stock at the knife-edge and also reducing the wear between the tracer and the pattern. I have shown both corners of the edge of the pattern beveled off and the groove in the tracer made to fit the edge of the pattern, and this is desirable; but the essential matter of this feature of my invention is to so shape the working face of the tracer that a lip on or carried by the tracer will enter slightly between the stock P and pattern N. The grooved tracer $k'$ also acts to keep the spindle $k^2$ in its socket in the hollow stud of slide B, and this combination of a tracer with its working face grooved to receive the edge of the pattern and a knife and spindle projecting from it is also new with me and one feature of my invention.

The operation is as follows: The stock P is clamped in place, and when the tracer $k'$ is in contact with the edge of pattern N the lip carried by tracer $k'$ enters between the stock P and pattern N. The shipping-lever Q is then moved to start the machine, and this motion causes the wedge $q$ to throw lever $q'$ in the path of trip $q^2$, so that the machine will stop automatically when the operation is completed, as will be clear to all skilled in the art, it being customary to use a self-stopping device on machines of this class. The speed of plate $A^2$ will be that of gear A', as before explained, and the speed of the swivel-head $b'$ as it travels with plate $A^2$ will of course be the same as the speed of plate $A^2$. Consequently the knife-carriage support $B^2$ and the other parts of the knife-carriage B' and B will move about pattern N with a varying speed. As the slide B is controlled by the tracer $k'$ and the pattern N as to its movements in one direction, it will be moved against the force of spring M whenever the shape of pattern N is such as to require it, and yet tracer $k'$ will be held always closely against the edge of pattern N by the force of spring M, as will be clear, while the groove in tracer $k'$, coöperating with the edge of pattern N, will not only aid to keep the tracer and pattern in proper relation, but also preserve the edge of the pattern, diminish wear, support the stock P close to the point where it is cut by the knife $k$, and keep the spindle $k^2$ in its socket. While the knife $k$ and the tracer $k'$ may be made in one piece, it is preferable to make them in separate pieces, not only because the tracer $k'$ may be then of a different metal, but also because the cutting edge of the knife may then extend across the lip carried by the tracer or that part of the tracer which extends between the pattern and the stock. After the knife has been several times sharpened its cutting edge is apt to slant forward, and such a slant tends to crowd the stock down upon the pattern and upon that part of the tracer which is under the stock, and in order to make a clean cut it is necessary to have the knife-edge extend across that surface of the tracer which supports the stock near the knife-edge, and for the best results that surface should be the upper surface of a lip which extends between the stock and the pattern.

What I claim as my invention is—

1. In combination a table mounted on a shaft; that shaft; a carriage moving radially toward and from the axis of the shaft to carry the knife about a pattern; that pattern; means to connect the knife-carriage with the table and compel it to move radially as the pattern requires; an oblong eccentric driven gear fast to the shaft; and an oblong eccentric driving-gear, in mesh with the driven gear; all substantially as described.

2. In combination cam D; revolving table $A^2$; a knife-carriage whose main part $B'$ terminates in head $b'$; that head $b'$, pin $b^2$ fast to and on one side of head $b'$; slide $b$ in which pin $b^2$ is journaled; and rolls $b^3$ whose studs extend from the other side of head $b'$, and on opposite sides of the axis of pin $b^2$; all substantially as and for the purpose specified.

3. The compound knife-carriage, made up of a main support; an adjustable bed; means for clamping the adjustable bed to the main support; a knife-carrying portion; and a spring between the knife-carrying portion and the adjustable bed, all combined substantially as set forth.

4. In combination the knife-carrier; its bed; the jointed frame composed of two pairs of toggle-arms jointed at one side to the knife-carrier, and at the other side to the bed; and the controlling-spring across the jointed frame; substantially as and for the purpose specified.

5. In combination a tracer with a groove in its working face narrowed at its base; a shank on which the tracer can swivel projecting from one side of the tracer; and a knife projecting from the other side of the tracer, substantially as described.

6. In combination a tracer; a lip projecting from its working face; and a knife whose edge extends across that lip, substantially as and for the purpose specified.

AMASA EUGENE LINCOLN.

Witnesses:
J. E. MAYNADIER,
JOHN R. SNOW.